United States Patent Office 3,137,144
Patented June 16, 1964

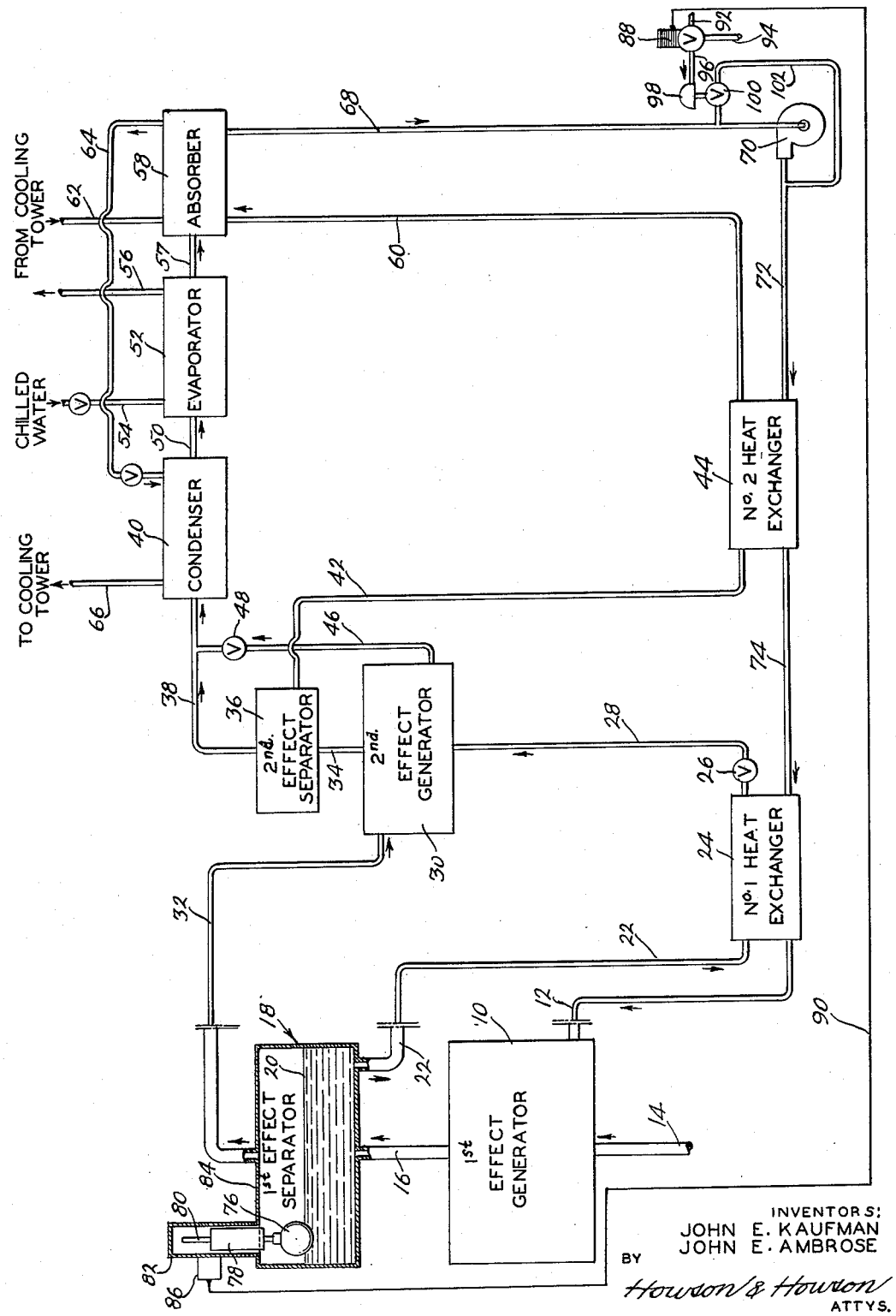

3,137,144
LEVEL CONTROL AND FAIL SAFE ARRANGEMENT FOR ABSORPTION REFRIGERATION SYSTEMS
John E. Kaufman and John E. Ambrose, San Antonio, Tex., assignors to American Gas Association, New York, N.Y., a corporation of New York
Filed July 27, 1962, Ser. No. 212,784
2 Claims. (Cl. 62—141)

The present invention relates generally to absorption refrigeration systems, and more particularly to a level control and fail safe arrangement for multiple regenerative effect absorption refrigeration systems.

Although the invention is particularly well suited for use with the absorption refrigeration system presented in the copending U.S. application Serial Number 240,799, filed November 29, 1962, assigned with the present application to a common assignee, it is suitable for use with any system wherein a liquid is pumped into a treating region, to control the liquid level and to provide means for automatically draining a region of liquid during shutdown or in the event of power failure.

In a multiple effect absorption system, it is important in order to maintain the efficiency of the unit, to prevent liquid absorbent from passing into the refrigerant lines. This is most apt to occur at the first effect separator stage, particularly if the liquid refrigerant level should fill the separator chamber and pass into the refrigerant vapor outlet.

An additional problem is the possibility of crystallization of concentrated absorbent in the first effect generator upon shutdown or power failure. In such instances, when circulation of the absorbent solution is halted, the solution in the first effect generator continues to be heated by the slowly cooling generator resulting in an overconcentration of the solution with the danger of crystallization of the absorbent. Crystallization can cause a mechanical blockage of the system, prevent circulation of the fluids and possibly severely damage the equipment when the unit is later restarted.

To provide a remedy for both the above problems it is accordingly a first object of the present invention to provide a combined level control and fail safe arrangement which will control a liquid level in a treating zone and which will, in addition, release the liquid from the treating zone upon power failure or shutdown of the unit.

It is a further and more specific object of the invention to provide a device for controlling the level of absorbent solution in the separator of an absorption refrigeration unit which also prevents overconcentration of absorbent solution in the generator of the unit upon power failure or shutdown of the unit.

Additional objects and advantages of the invention will be more readily apparent from the following detailed description of an embodiment thereof when taken together with the accompanying drawing, which shows in diagrammatic fashion a multiple effect absorption refrigeration system provided with a level control and fail safe arrangement according to the present invention.

Referring to the drawing, dilute absorbent solution is introduced to the first effect generator 10 through conduit 12. Natural gas is introduced into the generator 10 through conduit 14 and provides a heat source for boiling the absorbent solution to vaporize refrigerant therefrom. Vaporized refrigerant and liquid absorbent pass from the generator 10 through conduit 16 into first effect separator 18.

Liquid absorbent solution is accumulated in the lower portion of the separator chamber, for example, to a level 20. The solution passes from the separator 18 through conduit 22 in No. 1 heat exchanger 24 in which heat is transferred from the absorbent solution to the counterflowing dilute absorbent solution passing into the first effect generator. From the No. 1 heat exchanger the solution is led through expansion valve 26 and conduit 28 into the second effect generator 30.

Refrigerant vapors pass from the upper portion of the first effect separator chamber through conduit 32 into the second effect generator. The generator 30 is basically a heat exchanging unit in which the throttled and cooled absorbent solution is boiled at a temperature below the condensing vapor temperature of the vaporized refrigerant to provide a second generating effect which substantially increases the overall thermal efficiency of the unit.

Concentrated liquid absorbent and the additional vaporized refrigerant pass through conduit 34 into the second effect separator 36. The refrigerant vapor is separated from the absorbent and passed through conduit 38 into condenser 40. The concentrated absorbent is passed through conduit 42 into No. 2 heat exchanger 44 to preheat dilute absorbent solution before its introduction into the No. 1 heat exchanger and the first effect generator 10.

The refrigerant vapors from the first effect separator which are introduced into the second effect generator through conduit 32, some of which may be condensed in the second effect generator, are led from the second effect generator through conduit 46 and expansion valve 48 into condenser 40.

Refrigerant from both the second effect separator 36 and the second effect generator 30 is condensed in condenser 40 and subsequently passed through conduit 50 into evaporator 52. Evaporation of the refrigerant removes heat from the medium to be cooled, in this instance, chilled water passing into and out from the evaporator through conduits 54 and 56.

Vaporized refrigerant passes from the evaporator through conduit 57 into absorber 58 where it is absorbed into the concentrated absorbent brought from the No. 2 heat exchanger 44 through conduit 60 into the absorber. A cooling fluid from a cooling tower is introduced into the absorber through conduit 62 and receives the heat liberated in the absorption process. The cooling medium passes from the absorber through conduit 64 and into condenser 40 where it absorbs additional heat in condensing refrigerant vapors. The cooling medium is passed from the condenser back to the cooling tower through conduit 66.

The dilute absorbent solution passes from the absorber through conduit 68 into pump 70. The high pressure pump output passes through conduit 72, through No. 2 heat exchanger 44 where it is heated, through conduit 74, and into the No. 1 heat exchanger where it is additionally heated prior to introduction into the first effect generator.

The efficiency of such a system is due, basically to evaporation of refrigerant in two stages in which the heat from the first stage refrigerant is used to generate more refrigerant in the second stage. As a consequence of the wide pressure range in the system pump 70 is required to pump solution from absorber 58 to first effect generator 10. However, the pressure regions cause several problems, a first being the possibility that the liquid level in the first effect separator will raise so as to fill the separator chamber and force absorbent into the refrigerant line 32. Absorbent in the refrigerant lines would at the very least, affect the efficiency of the system, and could make the system inoperative.

A second problem is that which arises upon shutdown or power failure. The pump 70 prevents solution pumped into generator 10 from draining back into the low pressure absorber region upon shutdown or power failure of the unit. When the pump is stopped, circulation of absorbent and refrigerant fluids comes to a halt. However, the heating effect of generator 10 continues until the generator has cooled, thus continuing to boil the solution contained therein. Continued heating of the non-flowing absorbent solution results in an overconcentration of absorbent wihch is apt to crystallize in the generator. Crystallization will block the fluid passages and prevent proper circulation of the fluids when the system is again placed in operation.

The present invention serves a two-fold purpose in controlling liquid level in the first effect separator as well as preventing crystallization of absorbent in the first effect generator upon shutdown or power failure. To accomplish this purpose the structure of the invention includes ball float 76 adapted to float on the absorbent solution surface level 20. Magnetic element 78 is attached to vertical stem 80 secured to the ball float 76. Sleeve 82 is secured in sealing relationship to casing 84 of the first effect separator 18. The sleeve is of a size and shape sufficient to permit the float, stem and magnetic element assembly to move vertically therewithin upon variations in the level of the absorbent solution in the first effect separator.

Magnetic switch 86 is attached to the side of sleeve 82 and is operatively connected with solenoid valve 88 by means of electric circuit 90. The solenoid valve 88 is a three-way valve, conduit 92 of which is attached to a water supply. Conduit 94 is a water outlet to drain. Conduit 96 connects the valve 88 with water powered operator 98 which is operatively connected with spring loaded diaphragm valve 100. Valve 100 controls flow through by-pass conduit 102 which circumvents pump 70.

In operation, magnetic switch 86 is normally closed and circuit 90 is energized so as to close solenoid valve 88 to direct the water supply of conduit 92 into conduit 96, to actuate water powered operator 98 which acts against the spring mechanism of valve 100 to hold the valve closed. Thus, under normal circumstances of operation of the refrigeration system, the by-pass conduit 102 is closed and pump 70 maintains a pressure differential in the system.

When the absorbent solution level 20 in the first effect separator reaches a predetermined maximum level, the rising float 76 and magnetic element 78 opens magnetic switch 86. Solenoid valve 88 opens and water is drained through conduit 94. Operator 98 is without water pressure, permitting spring loaded valve 100 to open and allowing a flow of absorbent solution back through by-pass conduit 102. The flow of fluid from the pump to the first effect generator is in effect halted until absorbent solution level 20 in the first effect separator drops below the desired limit. The float and magnetic element drop with the solution level allowing switch 86 to close and returning valves 88 and 100 to their normal closed position.

The operation of the mechanism as a fail safe arrangement upon shutdown or power failure is similar to that described for the level control function. Shutdown or power failure would de-energize circuit 90 opening solenoid valve 88 and spring loaded valve 100, and permitting a flow of absorbent solution from the high pressure region of the first effect generator back through by-pass 102 into the low pressure region of the absorber. Such flow effectively drains the first effect generator of concentrated absorbent following shutdown or power failure. The danger of crystallization of absorbent in the generator is thus avoided. Starting up of the unit or restoration of power service re-energizes the circuit 90 and closes valves 88 and 100 thus closing the by-pass line 102.

Sleeve 82 is welded or otherwise secured to the casing 84 in a sealed manner to preserve the sealed nature of the system. The use of the magnetic element 78 in conjunction with magnetic switch 86 provides an effective method of signalling a high fluid level in a selaed liquid container without using valves, internal guages, or other devices which require an opening through the separator casing which is apt to leak and allow fluids to escape from the system. The ball float, stem and magnetic element are sealed within the system and require no adjustment or maintainence. These elements are preferably of a non-corrosive material such as stainless steel to avoid contaminating the refrigerant and absorbent fluids.

Manifestly changes in details of construction can be effected by those skilled in the art without departing from the spirit and the scope of the invention as defined in and limited solely by the appended claims.

I claim:

1. In an absorption refrigeration system including an evaporator, absorber, pump, generator, separator and condenser, the improvement consisting of a level control and fail safe comprising a by-pass conduit around said pump, electrically controllable valve means disposed in said by-pass conduit, a float in said separator adapted to float on the liquid level therein, a magnetic element secured to said float, a magnetic switch disposed on the exterior of said separator adapted for actuation by said magnetic element in response to variations in the liquid level in said separator, and an electric circuit operatively connecting said magnetic switch with said electrically controllable valve means whereby the liquid level in said separator in changing the position of said float and magnetic element causes said valve means to be actuated, thereby controlling the effective output of said pump and the liquid level in said separator.

2. In an absorption refrigeration system including an evaporator, absorber, pump, generator, separator and condenser, the improvement contsisting of a level control and fail safe comprising a by-pass conduit around said pump, a spring loaded valve in said by-pass conduit, a water-powered operator actuating said valve, water supply means for said water-powered operator, and a solenoid valve controlling said water supply means, a float in said separator adapted to float on the liquid level therein, a magnetic element secured to said float, a magnetic switch disposed on the exterior of said separator adapted for actuation by said magnetic element in response to variations in the liquid level in said separator, and an electric circuit operatively connecting said magnetic switch with said solenoid valve, whereby the liquid level in said separator in changing the position of said float and magnetic element opens and closes said magnetic switch thereby actuating said solenoid valve, water-powered operator, and spring-loaded valve to open and close said by-pass conduit thereby controlling the effective output of said pump and the liquid level in said separator, an opening of said electric circuit upon shutdown or power failure resulting in an opening of said solenoid valve, thus permitting said spring loaded valve to open and allowing an equalization of fluid pressure across said pump upon fluid flow through said by-pass conduit.

References Cited in the file of this patent

UNITED STATES PATENTS

| | | |
|---|---|---|
| 2,446,988 | Flukes et al. | Aug. 10, 1948 |
| 2,983,117 | Edberg et al. | May 9, 1961 |